(12) United States Patent
Nakamura et al.

(10) Patent No.: US 7,529,168 B2
(45) Date of Patent: May 5, 2009

(54) RECORDING/REPRODUCTION METHOD AND RECORDING/REPRODUCTION APPARATUS

(75) Inventors: Atsushi Nakamura, Osaka (JP); Mamoru Shoji, Osaka (JP)

(73) Assignee: Panasonic Corporation, Kadoma (JP)

( * ) Notice: Subject to any disclaimer, the term of this patent is extended or adjusted under 35 U.S.C. 154(b) by 541 days.

(21) Appl. No.: 10/715,663

(22) Filed: Nov. 18, 2003

(65) Prior Publication Data

US 2004/0100885 A1   May 27, 2004

(30) Foreign Application Priority Data

Nov. 21, 2002   (JP) .............................. 2002-337695

(51) Int. Cl.
*G11B 7/00* (2006.01)
(52) U.S. Cl. ................................. 369/59.12; 369/59.11
(58) Field of Classification Search ........................ None
See application file for complete search history.

(56) References Cited

U.S. PATENT DOCUMENTS

| | | | |
|---|---|---|---|
| 6,101,159 A | 8/2000 | Shoji et al. | |
| 6,628,583 B1 * | 9/2003 | Van Den Enden et al. | 369/47.1 |
| 7,068,579 B2 * | 6/2006 | Tasaka et al. | 369/59.24 |
| 7,095,696 B2 * | 8/2006 | Nakajima et al. | 369/59.12 |
| 2001/0043529 A1 | 11/2001 | Minemura et al. | |
| 2004/0022151 A1 | 2/2004 | Furumiya et al. | |

FOREIGN PATENT DOCUMENTS

| | | | |
|---|---|---|---|
| EP | 0 991 058 A1 | 4/2000 | |
| EP | 1 249 834 A2 | 10/2002 | |
| EP | 1 324 321 A1 | 7/2003 | |
| JP | 07105585 | 4/1995 | |
| JP | 7-129959 | 5/1995 | |
| JP | 2000-200418 | 7/2000 | |
| JP | 2000-231719 | 8/2000 | |
| JP | 3076033 | 9/2000 | |
| JP | 2002-208136 | 7/2002 | |
| JP | 2002-230770 | 8/2002 | |
| JP | 2002-260230 | 9/2002 | |
| WO | WO00/34952 | * | 6/2000 |
| WO | WO 02084653 A1 | * | 10/2002 |
| WO | WO 02089123 A1 | * | 11/2002 |

OTHER PUBLICATIONS

European Search Report corresponding to Application 03026371, dated Mar. 17, 2005.
Chinese Office Action for corresponding Application No. 200310116561.X dated Sep. 5, 2008 and English translation.
Japanese Office Action for corresponding Application No. 2003-381867 dated Dec. 26, 2008.

* cited by examiner

*Primary Examiner*—Thang V Tran
*Assistant Examiner*—Lixi Chow
(74) *Attorney, Agent, or Firm*—Renner, Otto, Boisselle & Sklar, LLP

(57) ABSTRACT

A recording/reproduction method is provided, which comprises the steps of generating a binary signal by converting a reproduction signal to a binary form, generating a synchronization signal using the binary signal, the synchronization signal being in synchronization with a clock signal, measuring a time interval between the binary signal and the synchronization signal and measuring an edge shift amount between the time interval and a clock time interval specified by the clock signal, and changing a parameter of a recording pulse based on the edge shift amount.

6 Claims, 8 Drawing Sheets

401 Binary signal
402 Synchronization signal
403 Clock signal
404 Binary signal
405 Synchronization signal
406 Clock signal

RECORDING/REPRODUCTION METHOD AND RECORDING/REPRODUCTION APPARATUS

BACKGROUND OF THE INVENTION

1. Field of the Invention

The present invention relates to a recording/reproduction method and a recording/reproduction apparatus.

2. Description of the Related Art

Phase change optical discs have been known as disk-like recording media onto which data can be recorded with a high density.

The phase change optical disc has a recording film for recording data.

Data is recorded onto a phase change optical disc in the following manner. A rotating phase change optical disc is irradiated with focused laser light, so that the recording film is heated to fuse. In this case, the physical property of the recording film is changed. A temperature which the heated recording film reaches and the cooling process of the recording film from the temperature vary depending on the power of laser light, so that data can be recorded onto a phase change optical disc.

More specifically, when the intensity of laser light is high, the recording film rapidly cools from a higher temperature state, so that the recording film becomes amorphous. When the intensity of laser light is relatively low, the recording film gradually cools from a lower temperature state, so that the recording film becomes crystalline.

In general, an amorphous portion of the recording film is called a mark, while a crystalline portion of the recording film is called a space. By forming marks and spaces in the recording film, binary information can be stored.

In phase change optical discs, past data can be erased and new data can be recorded, with a singly type of laser light, i.e., direct over-write can be performed.

Data is reproduced from a phase change optical disc in the following manner. A phase change optical disc is irradiated with weak laser light which cannot elicit a phase change in the recording film. Light reflected from the phase change optical disc is detected. Amorphous marks have low reflectivity, while crystalline spaces have high reflectivity. Therefore, by detecting the difference between the amounts of light reflected from marks and spaces, data can be reproduced from a phase change optical disc.

When a long mark is recorded onto a phase change optical disc by irradiating it with laser having a predetermined power, the radical thickness of the mark is gradually increased toward the trailing edge thereof due to the thermal storage effect of the recording film. In this case, a mark may be incompletely erased in direct over-write, or signal crosstalk may occur between tracks when reproducing data from a phase change optical disc, so that the quality of the phase change optical disc is largely impaired.

As described above, the reflectivity of a mark is lower than the reflectivity of a space in a phase change optical disc. This means that the heat absorption of a mark is higher than the heat absorption of a space. The heat of fusion required for fusing the amorphous portion is different from the heat of fusion required for fusing the crystalline portion.

Therefore, when a new mark is formed by irradiating an existing mark and space with laser light having the same power in direct over-write, the amount of heat absorption and the achieved temperature differs between the mark and the space. Thus, the edge of the new mark varies depending on the previous recorded state. Particularly in conventional recording operation, the amount of light for irradiating the second half of a mark is reduced. A problem arises such that the position of the edge of the second half of a mark varies significantly.

The length of a mark and a space is considered to be reduced in order to increase data recording density in the future. Particularly when the length of a space is short, heat which has been used to form the trailing edge portion of a mark is transferred to a space adjacent to the mark and then to the leading edge portion of the next mark. In this case, an increase in the temperature of the next mark is affected, or conversely, heat which is used to form the leading edge portion of a mark may have an influence on the cooling process for the trailing edge portion of the previous mark, i.e., thermal interference may occur. If thermal interference occurs in conventional recording operation, the edge positions of marks fluctuate, leading to an increase in an error rate in reproducing a phase change optical disc.

Japanese Patent No. 2679596 discloses a technique for solving the above-described problems (see FIG. 2). Here, a signal corresponding to a mark in the Pulse Width Modulation (PWM) recording format is divided into a leading edge portion having a predetermined width, a burst-like intermediate portion, and a trailing edge portion having a predetermined width. The signal is recorded by switching two-level laser output at high rate. To produce the intermediate portion of a long mark, a burst-like laser current is driven so that a disc is irradiated with light having a minimum power. As a result, the intermediate portion of the mark is not expanded and has a substantially constant width. A sufficient amount of laser light having a constant width is used in order to produce the leading edge portion and trailing edge portion of a mark. Therefore, jitter is not increased at the edge portion of the formed mark in direct over-write. In addition, when it is detected that a mark has a small length and spaces before and after the mark also have a small length, a mark is formed such that the positions of the leading edge portion and trailing edge portion of the mark are different from when the mark and the spaces have a long length. Thereby, thermal interference or peak shift due to reproduced frequency characteristics are compensated for in recording.

Japanese Laid-Open Publication No. 2000-231719 discloses a recording method in which a particular repetition pattern is recorded; the optimum amounts of movement of a first pulse and a last pulse are determined depending on data pattern; movement amount information indicating both or either of the determined movement amounts of the first and last pulses is recorded onto a recording medium during manufacture (see FIGS. 2 and 11-14). When the user records data onto the recording medium, the movement amount information is read out from the recording medium and recording is performed using the movement amount information. Thereby, learning for recording a mark on a correct position can be omitted or the time required for learning can be reduced, while the accuracy of positioning marks can be improved. Thus, jitter is reduced.

However, it is believed that data density is increased more and more in the future. In this case, the techniques described in the above publications each have a problem.

In the recording operation described in Japanese Patent No. 2679596, the length of a mark and the lengths of spaces before and after the mark are detected; when the length of the mark is small and the lengths of spaces before and after the mark are small, the leading edge portion and trailing edge portion of the mark is formed so that they are different from the leading edge portion and trailing edge portion of a mark formed when the length of the mark and the lengths of spaces are long;

thereby, thermal interference or peak shift due to reproduced frequency characteristics are compensated for in recording. Whereas the recording operation has high performance, the scale of an apparatus for achieving the recording operation is increased, leading to an increase in cost.

In the recording operation described in Japanese Laid-Open Publication No. 2000-231719, a particular repetition pattern is recorded; the optimum amounts of movement of a first pulse and a last pulse are determined depending on data pattern; movement amount information indicating both or either of the determined movement amounts of the first and last pulses is recorded onto a recording medium during manufacture; when the user records data onto the recording medium, the movement amount information is read out from the recording medium and a mark is recorded at a correct position. In the recording operation, the particular repetition pattern is recorded. Therefore, the scale of an apparatus for achieving the recording operation is increased, leading to an increase in cost.

Japanese Laid-Open Publication No. 2000-231719 also describes a recording operation in which a first pulse and a last pulse are moved by an optimum movement amount depending on a disc. However, it is not described that the width of a pulse (or multi-pulse) between the first and last pulses is changed or the width of a cooling pulse is changed in order to optimize recording/reproduction characteristics.

SUMMARY OF THE INVENTION

According to an aspect of the present invention, a recording/reproduction method is provided, comprising the steps of: generating a binary signal by converting a reproduction signal to a binary form; generating a synchronization signal using the binary signal, the synchronization signal being in synchronization with a clock signal; measuring a time interval between the binary signal and the synchronization signal and measuring an edge shift amount between the time interval and a clock time interval specified by the clock signal; and changing a parameter of a recording pulse based on the edge shift amount.

In one embodiment of this invention, the step of measuring the edge shift amount comprises measuring the edge shift amount for each number of clock cycles of the clock signal.

In one embodiment of this invention, the step of measuring the edge shift amount comprises repeatedly measuring a time interval between the binary signal and the synchronization signal, integrating the measured time intervals, and calculating a mean value of the edge shift amount.

In one embodiment of this invention, the parameter of the recording pulse includes at least one of a movement amount, a power, and a width of the recording pulse.

In one embodiment of this invention, the step of measuring the edge shift amount comprises measuring a leading edge time interval between a mark leading edge of the binary signal and a mark trailing edge of the synchronization signal, and measuring a leading edge shift amount between the leading edge time interval and the clock time interval.

In one embodiment of this invention, the step of measuring the edge shift amount comprises measuring a trailing edge time interval between a mark trailing edge of the binary signal and a mark leading edge of the synchronization signal, and measuring a trailing edge shift amount between the trailing edge time interval and the clock time interval.

In one embodiment of this invention, the step of measuring the edge shift amount comprises measuring a leading edge time interval between a mark leading edge of the binary signal and a mark trailing edge of the synchronization signal, measuring a leading edge shift amount between the leading edge time interval and the clock time interval, measuring a trailing edge time interval between a mark trailing edge of the binary signal and a mark leading edge of the synchronization signal, and measuring a trailing edge shift amount between the trailing edge time interval and the clock time interval.

In one embodiment of this invention, the reproduction signal is a signal obtained reproducing an arbitrary random signal sequence.

In one embodiment of this invention, the recording pulse contains a first pulse and a cooling pulse; and parameters of the first pulse and the cooling pulse are grouped into three or more categories depending on mark length.

In one embodiment of this invention, the measuring step comprises measuring a jitter value; the recording pulse contains a first pulse, a multipulse, and a cooling pulse; the step of changing the parameter of the recording pulse comprises changing a movement amount of the first pulse based on the leading edge shift amount, changing a movement amount of the cooling pulse based on the trailing edge shift amount, and changing a movement amount of the multipulse based on the jitter value.

In one embodiment of this invention, the measuring step comprises measuring a jitter value; the recording pulse contains a first pulse, a multipulse, and a cooling pulse; the step of changing the parameter of the recording pulse comprises changing a movement amount of the first pulse based on the leading edge shift amount, changing a movement amount of the multipulse based on the trailing edge shift amount, and changing a movement amount of the cooling pulse based on the jitter value.

In one embodiment of this invention, the measuring step comprises measuring a jitter value; the recording pulse contains a first pulse, a multipulse, and a cooling pulse; the step of changing the parameter of the recording pulse comprises changing a movement amount of the first pulse based on the leading edge shift amount, changing a power of the multipulse based on the trailing edge shift amount, and changing a movement amount of the cooling pulse based on the jitter value.

According to another aspect of the present invention, a recording/reproduction apparatus is provided, comprising: a binary signal generating section for generating a binary signal by converting a reproduction signal to a binary form; a synchronization signal generating section for generating a synchronization signal using the binary signal, the synchronization signal being in synchronization with a clock signal; an edge shift measuring section for measuring a time interval between the binary signal and the synchronization signal and measuring an edge shift amount between the time interval and a clock time interval specified by the clock signal; and a pulse changing section for changing a parameter of a recording pulse based on the edge shift amount.

In one embodiment of this invention, the edge shift measuring section measures the edge shift amount for each number of clock cycles of the clock signal.

In one embodiment of this invention, the edge shift measuring section repeatedly measures a time interval between the binary signal and the synchronization signal, integrates the measured time intervals, and calculates a mean value of the edge shift amount.

In one embodiment of this invention, the parameter of the recording pulse includes at least one of a movement amount, a power, and a width of the recording pulse.

In one embodiment of this invention, the edge shift measuring section measures a leading edge time interval between a mark leading edge of the binary signal and a mark trailing edge of the synchronization signal, and measures a leading edge shift amount between the leading edge time interval and the clock time interval.

In one embodiment of this invention, the edge shift measuring section measures a trailing edge time interval between a mark trailing edge of the binary signal and a mark leading edge of the synchronization signal, and measures a trailing edge shift amount between the trailing edge time interval and the clock time interval.

In one embodiment of this invention, the edge shift measuring section measures a leading edge time interval between a mark leading edge of the binary signal and a mark trailing edge of the synchronization signal, measures a leading edge shift amount between the leading edge time interval and the clock time interval, measures a trailing edge time interval between a mark trailing edge of the binary signal and a mark leading edge of the synchronization signal, and measures a trailing edge shift amount between the trailing edge time interval and the clock time interval.

In one embodiment of this invention, the reproduction signal is a signal obtained reproducing an arbitrary random signal sequence.

In one embodiment of this invention, the recording pulse contains a first pulse and a cooling pulse; and parameters of the first pulse and the cooling pulse are grouped into three or more categories depending on mark length.

In one embodiment of this invention, the edge shift measuring section measures a jitter value; the recording pulse contains a first pulse, a multipulse, and a cooling pulse; the pulse changing section changes a movement amount of the first pulse based on the leading edge shift amount, changes a movement amount of the cooling pulse based on the trailing edge shift amount, and changes a movement amount of the multipulse based on the jitter value.

In one embodiment of this invention, the edge shift measuring section measures a jitter value; the recording pulse contains a first pulse, a multipulse, and a cooling pulse; the pulse changing section changes a movement amount of the first pulse based on the leading edge shift amount, changes a movement amount of the multipulse based on the trailing edge shift amount, and changes a movement amount of the cooling pulse based on the jitter value.

In one embodiment of this invention, the edge shift measuring section measures a jitter value; the recording pulse contains a first pulse, a multipulse, and a cooling pulse; the pulse changing section changes a movement amount of the first pulse based on the leading edge shift amount, changes a power of the multipulse based on the trailing edge shift amount, and changes a movement amount of the cooling pulse based on the jitter value.

According to the present invention, a time interval between a binary signal obtained by converting a reproduction signal into a binary form and a synchronization signal which is generated using the binary signal and is in synchronized with a clock signal is measured; an edge shift amount between the time interval and a clock time interval specified by the clock signal is measured; and based on the edge shift amount, a parameter of a recording pulse is changed. By performing recording with such a changed parameter of a recording pulse, an edge shift amount which occurs when record data is subsequently reproduced is reduced, whereby more accurate reproduction can be achieved.

According to the present invention, an edge shift amount is measured by reproducing an arbitrary random signal without recording a particular repetition pattern. By changing a parameter of a recording pulse based on the edge shift amount, optimum recording compensation is performed depending on a disc, thereby making it possible to improve recording/reproduction characteristics of a disc. In addition, recording pattern can be reduced, whereby a recording/reproduction apparatus can be simplified to a large extent.

Thus, the invention described herein makes possible the advantages of providing a recording/reproduction method with which a random signal is recorded without limiting to particular repetition patterns and a parameter of a recording pulse is changed based on a reproduction signal reproduced from the signal; and a recording/reproduction apparatus in which data can be optimally recorded even when the disc structure, the composition type of a recording film, and the type of a recording medium (e.g., a rewritable recording medium and a write-once recording medium) vary.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
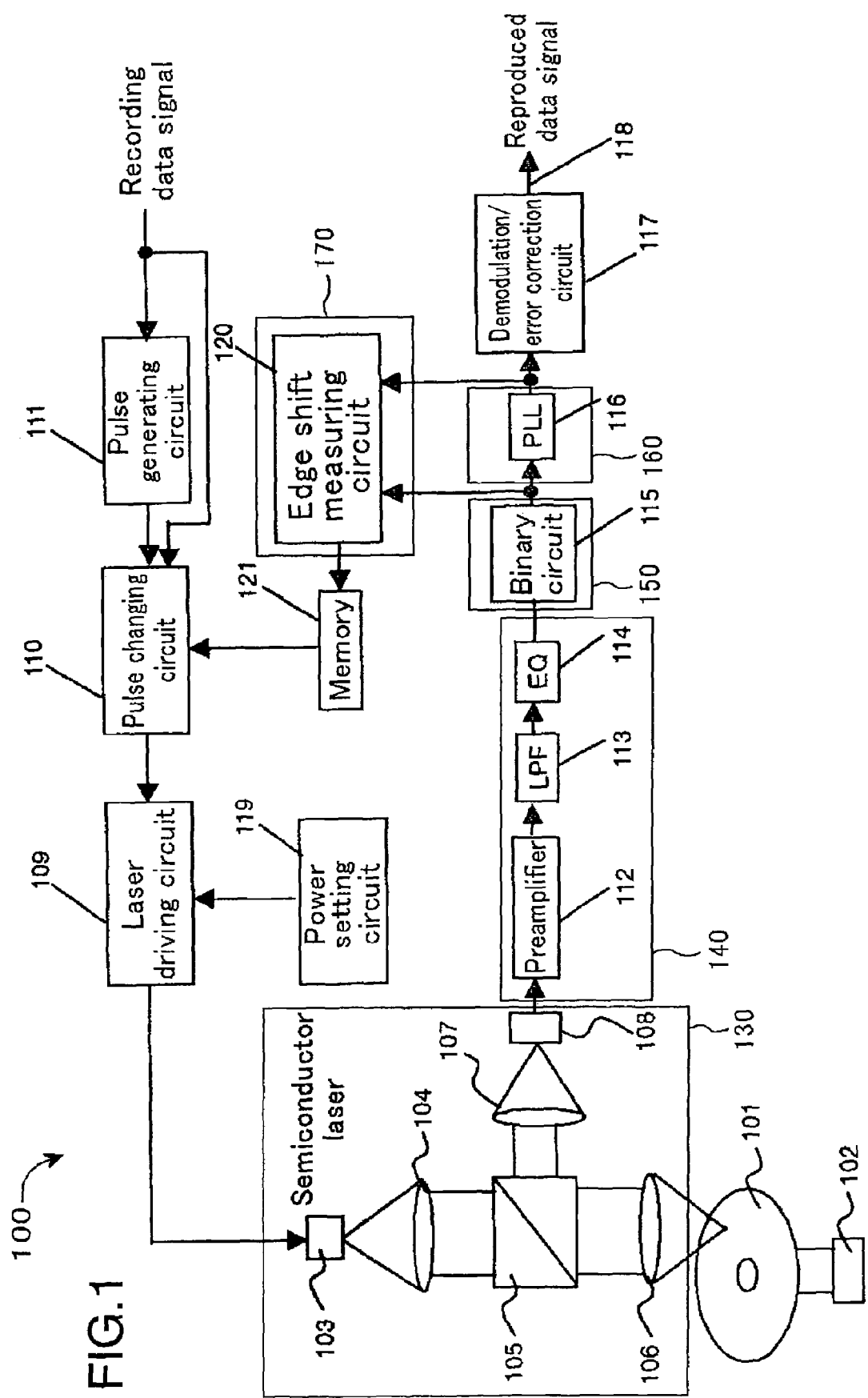
FIG. 1 shows a block diagram showing a recording/reproduction apparatus according to an embodiment of the present invention.

FIG. 1 is a block diagram showing a recording/reproduction apparatus 100 according to an embodiment of the present invention.

The recording/reproduction apparatus 100 is used as a recording/reproduction apparatus for manufacturers which produce information recording media. The recording/reproduction apparatus 100 is not limited to this. The recording/reproduction apparatus 100 is used as a recording/reproduction apparatus for general users.

The recording/reproduction apparatus 100 comprises: a spindle motor 102 for rotating an optical disc 101 as an information recording medium; an optical head 130 for bringing a light spot of laser light into a predetermined area of the optical disc 101; a laser driving circuit 109 for driving the optical head 130; a pulse changing circuit 110 for changing a parameter of a recording pulse; a pulse generating circuit 111 for generating a recording pulse using a recording data signal; a reproduction signal generating section 140 for generating a reproduction signal using a signal corresponding to a light reflected from the optical disc 101; a binary signal generating section 150 for generating a binary signal by converting a reproduction signal into binary form; a synchronization signal generating section 160 for generating a synchronization signal which is in synchronization with a clock signal using a binary signal; a demodulation/error correction circuit 117 for demodulating a synchronization signal and subjecting the resultant signal to error correction to generate a reproduced data signal; a power setting circuit 119 for setting the power of laser light for irradiating the optical disc 101; an edge shift measuring section 170 for measuring a time interval between the binary signal and the synchronization signal and determining a parameter of a recording pulse based on edge shift amount between the time interval and a clock time interval specified by a clock signal; and a memory 121 for storing a parameter of a recording pulse. The memory 121 stores parameters of a recording pulse in a table.

The optical head 130 comprises: a semiconductor laser 103 for emitting laser light; a collimator lens 104 for collimating laser light emitted by the semiconductor laser 103; a beam splitter 105 for transmitting laser light collimated by the collimator lens 104 and changing the traveling direction of light reflected from the optical disc 101; an objective lens 106 for converging laser light which has transmitted through the collimator lens 104 onto the optical disc 101 to form a light spot; a condenser 107 for collecting reflected light whose traveling direction has been changed by the beam splitter 105; and a photodetector 108 for detecting light which has been collected by the condenser 107 to form a signal.

The reproduction signal generating section 140 comprises: a preamplifier 112 for amplifying a signal generated by the photodetector 108; a low-pass filter 113 for attenuating signals having a predetermined frequency or more among signals amplified by the preamplifier 112; and an equalizer 114 for compensating for characteristics of a signal output by the low-pass filter 113. The equalizer 114 outputs an output signal as a reproduction signal to the binary signal generating section 150.

The binary signal generating section 150 comprises a binary circuit 115 for generating a binary signal by slicing a reproduction signal at a slice level.

The synchronization signal generating section 160 comprises a PLL (Phase Lock Loop) 116. The PLL 116 repeatedly generates a synchronization signal which is in synchronization with a clock signal using the binary signal to generate a synchronization signal having a mean pulse width.

The edge shift measuring section 170 comprises an edge shift measuring circuit 120. The edge shift measuring circuit 120 measures a time interval between the binary signal and a synchronization signal and integrates the measured time interval to obtain a mean time interval. Next, the edge shift measuring circuit 120 detects the average of an edge shift amount between a mean time interval and a clock time interval specified by a clock signal and determines a parameter of a recording pulse based on the mean edge shift amount. Here, the parameter of a recording pulse includes at least one of the movement amount, width, and power of the recording pulse.

The memory 121 stores a parameter of a recording pulse obtained by the edge shift measuring circuit 120.

The pulse generating circuit 111 generates recording pulses using a recording data signal and outputs an output signal containing the recording pulse to the pulse changing circuit 110.

The pulse changing circuit 110 changes a parameter of a recording pulse stored in the memory 121 using a parameter of a recording pulse and outputs an output signal containing the recording pulse having the changed parameter to the laser driving circuit 109.

The laser driving circuit 109 drives the semiconductor laser 103 using an output signal from the pulse changing circuit 110 so that the semiconductor laser 103 emits laser light having power set by the power setting circuit 119.

The peak power, bias power, and bottom power of laser light emitted by the semiconductor laser 103 are set by the power setting circuit 119.

When the optical disc 101 is loaded into the recording/reproduction apparatus 100, the recording/reproduction apparatus 100 measures a time interval between a binary signal and a synchronization signal using a predetermined area of the optical disc 101 and detects an edge shift amount between the measured time interval and a clock time interval.

The predetermined area includes recording areas (e.g., a drive test zone, etc.), except for user areas provided in innermost and outermost areas of a disc. The user records data into user areas.

However, in the present invention, an area on the optical disc 101 in which an edge shift amount between a binary signal and a synchronization signal is measured is not limited to the above-described recording area. Any area may be used. The timing of measuring an edge shift amount is not limited to when the optical disc 101 is loaded in the recording/reproduction apparatus 100. Any timing may be used.

For example, a user area on the optical disc 101 may be used to measure an edge shift amount. In this case, when it becomes necessary to measure an edge shift amount during recording data into a user area, an edge shift amount can be measured using a user area in which data has been recorded without returning to a predetermined area. Therefore, it is not necessary to move the optical head 130 so as to measure an edge shift amount, or a time required for moving the optical head 130 can be largely reduced. This feature is particularly useful for recording AV data which requires real-time performance. Further, by measuring an edge shift amount in the vicinity of an area into which data is recorded, an edge shift amount can be more accurately obtained.

Alternatively, the recording/reproduction apparatus 100 may measure an edge shift amount when a predetermined condition monitored by the recording/reproduction apparatus 100 is changed.

In general, the recording/reproduction apparatus 100 monitors a predetermined condition. When detecting a change in the condition, the recording/reproduction apparatus 100 optimizes a predetermined operation.

The recording/reproduction apparatus 100 monitors a temperature thereof and monitors a tilt angle of the optical disc 101, for example, in order to optimize another operation. For example, if the temperature of the recording/reproduction apparatus 100 is changed by 5° C. or more or the tilt angle of the optical disc 101 is changed by 0.5° or more, the recording/reproduction apparatus 100 may optimize another operation and measure an edge shift amount.

Thus, the recording/reproduction apparatus 100 reproduces data from the optical disc 101 to generate a reproduction signal and generate a binary signal and a synchronization signal based on the reproduction signal. Next, an edge shift amount is measured using a binary signal indicating a state recorded in the optical disc 101 and a synchronization signal indicating a signal to be read from the data. By changing a parameter of a recording pulse based on the edge shift amount, data can be recorded where the edge shift amount is compensated for. As a result, the recorded data is more accurately reproduced.

Figure 2:
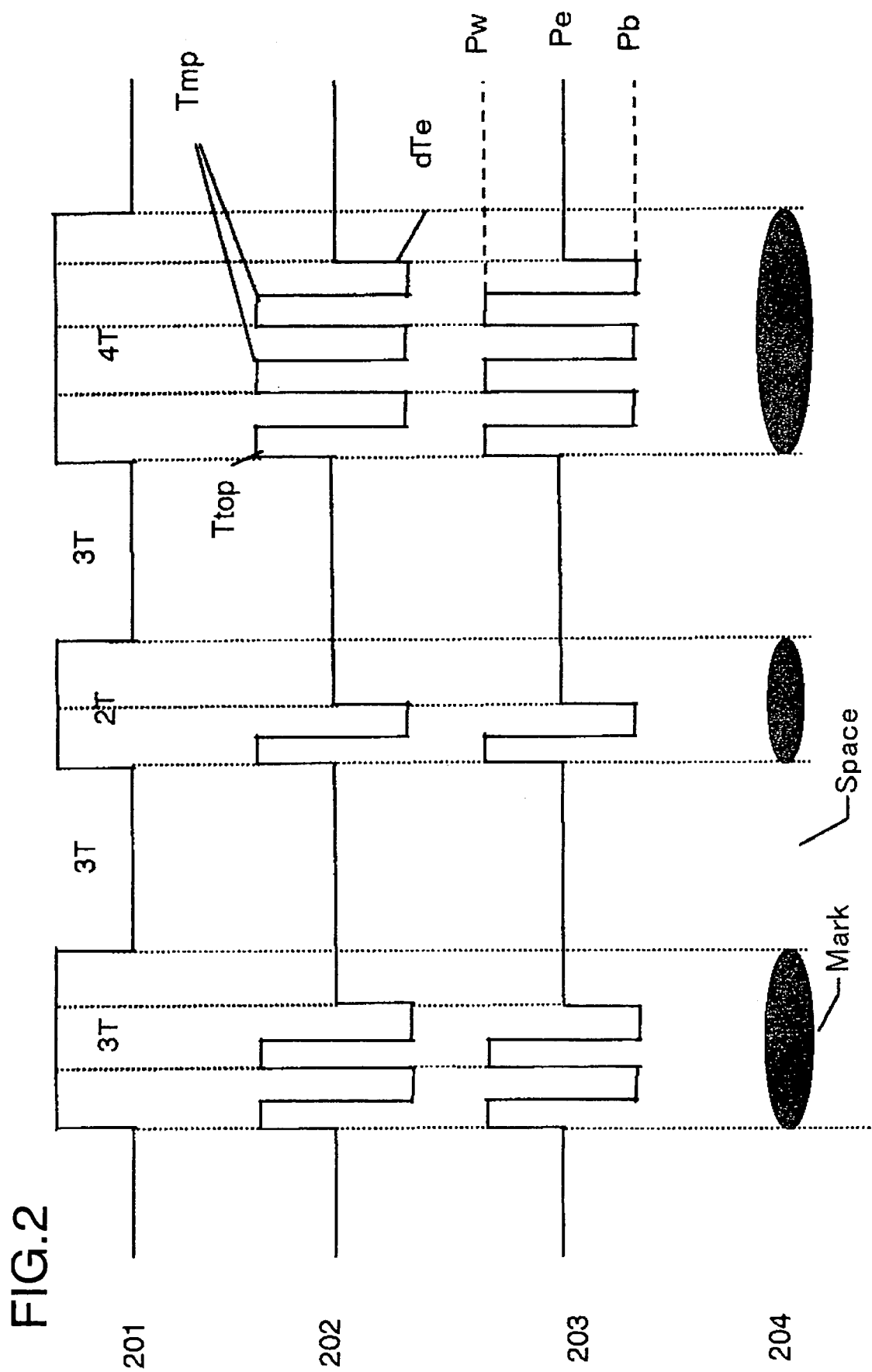
FIG. 2 shows waveform diagrams of a recording data signal and a signal corresponding to the recording data signal, and a schematic diagram of recorded states of an optical disc, according to an embodiment of the present invention.

FIG. 2 shows waveform diagrams of a recording data signal and a signal corresponding to the recording data signal, and a schematic diagram of recorded states of an optical disc according to an embodiment of the present invention.

Hereinafter, an embodiment in which a recording data signal is recorded into the optical disc 101 will be described with reference to FIGS. 1 and 2.

FIG. 2 shows waveforms of an NRZI-series recording data signal 201, an output signal 202 of the pulse generating circuit 111, and an output signal 203 of the pulse changing circuit 110, and recorded states 204 of the optical disc 101.

Not all of the recording data signal 201, the output signal 202 of the pulse generating circuit 111, and the output signal 203 of the pulse changing circuit 110 necessarily take place at the same time. In FIG. 2, corresponding portions are vertically aligned for the sake of clarification.

The recorded state 204 of the optical disc 101 is associated with the output signal 203.

The peak power (Pw), bias power (Pe), and bottom power (Pb) of the output signal 203 are modulated as shown in FIG. 2.

Here, a 17PP-modulated data signal is used as the NRZI-series recording data signal 201. When a 17PP-modulated data signal is recorded in a mark edge recording format, there are marks and spaces respectively having a length of the shortest 2T to the longest 9T (9T is a SYNC code). Here, T represents a reference cycle. The NRZI-series recording data signal 201 has a data sequence having an integral multiple of T.

Although the NRZI-series recording data signal 201 will be described below, the recording data signal 201 may have actual user data or a data sequence obtained by modulating symbol data corresponding to user data in accordance with a 17PP modulation rule.

The pulse generating circuit 111 generates a recording pulse using the NRZI-series recording data signal 201. The pulse generating circuit 111 outputs the output signal 202 containing the recording pulse to the pulse changing circuit 110. The pulse generating circuit 111 outputs the output signal 202 containing recording pulses respectively corresponding to marks ranging from 2T to 9T. The output signal 202 of FIG. 2 contains output signals having recording pulses corresponding to marks 3T, 2T, and 4T.

Hereinafter, among recording pulses, a leading pulse is called a first pulse and a tail pulse is called a cooling pulse. Pulses present between the first pulse and the cooling pulse are called multipulses. Multipulses each have a pulse of a predetermined cycle.

In the output signal 202 of FIG. 2, as an example, a first pulse is indicated by Ttop, multipulses are indicated by Tmp, and a cooling pulse is indicated by dTe.

A recording pulse corresponding to a mark of 3T contains 1 multipulse. A recording pulse corresponding to a mark of 4T contains 2 multipulses. A recording pulse corresponding to a mark of 5T contains 3 multipulses. Thus, as the length of a mark is increased by T, the number of multipulses is increased by one. Conversely, as the length of a mark is decreased by T, the number of multipulses is decreased by one. A mark of 2T contains a first pulse and a cooling pulse but not a multipulse.

Note that in the embodiment the time length of a first pulse is 0.5T, the time length of a cooling pulse is 0.5T, and the time length of a multipulse is 0.5T. These time lengths may vary depending on the structure of the optical disc 101. The number of multipulses or the cycle of a multipulse is not limited to the above-described values.

The pulse generating circuit 111 outputs the output signal 202 to the pulse changing circuit 110. The pulse changing circuit 110 outputs the output signal 203 to the laser driving circuit 109. In FIG. 2, the waveform of the output signal 203 is the same as that of the output signal 202. A parameter of a recording pulse is not changed by the pulse changing circuit 110.

The pulse changing circuit 110 changes a parameter of a recording pulse of the output signal 202 and outputs the output signal 203 containing a recording pulse having a changed parameter to the laser driving circuit 109.

Hereafter, a specific example will be described, in which the pulse changing circuit 110 changes a movement amount of a recording pulse as a parameter of the recording pulse.

In this case, the pulse changing circuit 110 changes the movement amount of a recording pulse. More specifically, at least one of a first pulse, a cooling pulse, and multipulses is changed by an arbitrary movement amount. In this case, movement amounts of at least one of a first pulse, a cooling pulse, and multipulses may be determined based on the length of a mark.

In this embodiment, marks ranging from 2T to 9T are divided into three groups: marks of 2T, marks of 3T, and marks of 4T or more; and a movement amount is determined for each group. The movement amount of a multipulse may be zero depending on the length of a mark. Alternatively, a multipulse may be changed by a predetermined movement amount depending on the optical disc 101.

When the optical disc 101 is loaded into the recording/reproduction apparatus 100 to activate it, the positions of a first pulse, a cooling pulse, and a multipulse optical disc 101 may be established based on values (initial values) described in a disc information area in an inner portion of the disc; thereafter, recording may be performed on trial; and movement amounts may be established based on the result of the recording.

In the recording/reproduction apparatus 100, the recording data signal 201 is transferred to the pulse generating circuit 111 and the pulse changing circuit 110.

The memory 121 stores, in advance, movement amounts of a first pulse and a cooling pulse for each mark length and a movement amount of a multipulse. The pulse generating circuit 111 outputs the output signal 202 to the pulse changing circuit 110.

The pulse changing circuit 110 analyzes the recording data signal 201 to detect the length of a mark in the recording data signal 201. For example, when a mark of 3T in the recording data signal 201 is input to the pulse changing circuit 110, the pulse changing circuit 110 detects the length of a mark (3T) and reads out movement amounts for a mark of 3T from the memory 121 in accordance with the length of a mark (3T). Thus, the pulse changing circuit 110 reads out movement amounts for each mark length from the memory 121. A first pulse, a multipulse, and a cooling pulse of recording pulses contained in the output signal 202 output with a predetermined delay time by the pulse generating circuit 111 are changed by respective movement amounts read out from the memory 121.

The initial values of movement amounts are read out from the memory 121 immediately after activation of the recording/reproduction apparatus 100. The pulse changing circuit 110 changes a first pulse, a multipulse, and a cooling pulse of the output signal 202 output with a predetermined delay time from the pulse generating circuit 111 by the respective initial values of movement amounts.

The pulse changing circuit 110 outputs the output signal 203 to the laser driving circuit 109. The laser driving circuit 109 drives the semiconductor laser 103 using the output signal 203. As a result, data is recorded onto the optical disc 101.

Next, a reproduction operation will be described in which data is reproduced from the optical disc 101.

Figure 3:
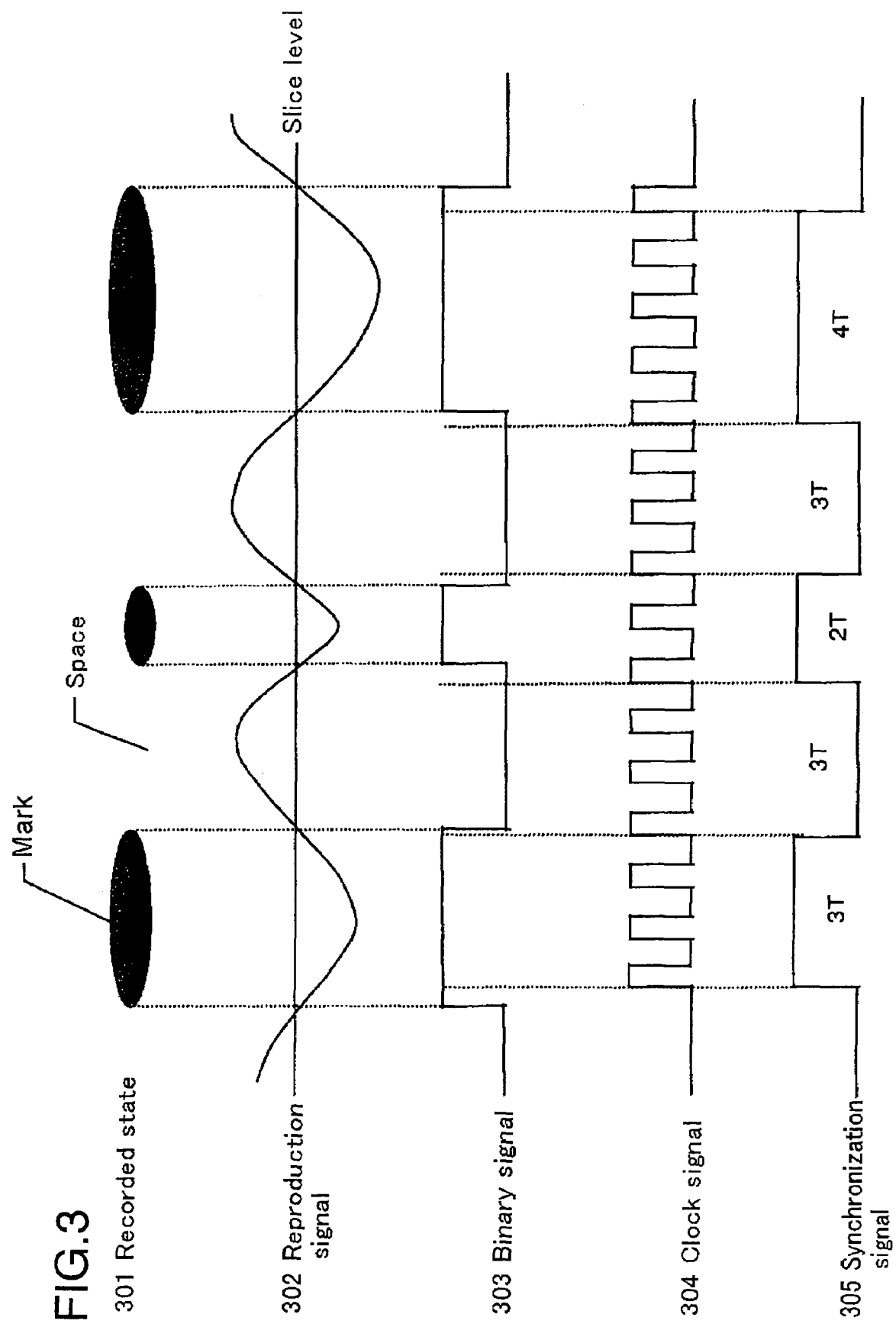
FIG. 3 shows waveform diagrams of a reproduced data signal and a signal corresponding to the reproduced data signal, and a schematic diagram of recorded states of an optical disc, according to an embodiment of the present invention.

FIG. 3 shows waveform diagrams of a reproduction signal and a signal corresponding to the reproduction signal, and a schematic diagram of recorded states of an optical disc according to an embodiment of the present invention.

Hereinafter, an embodiment in which recorded states of the optical disc 101 are reproduced as data will be described with reference to FIGS. 1 and 3.

FIG. 3 shows a schematic diagram of recorded states 301 of the optical disc 101, and waveforms of a reproduction signal 302, a binary signal 303, a clock signal 304, and a synchronization signal 305.

Not all of the reproduction signal 302, the binary signal 303, the clock signal 304, and the synchronization signal 305 necessarily take place at the same time. In FIG. 3, corresponding portions are vertically aligned for the sake of clarification.

In FIG. 3, the recorded states 301 formed on a track of the optical disc 101 are associated with the reproduction signal 302, when data is reproduced from the optical disc 101.

As shown in the recorded state 301, marks and spaces are formed on the optical disc 101.

A signal corresponding to light reflected from the optical disc 101 is processed by the preamplifier 112, the low-pass filter 113, and the equalizer 114 to generate the reproduction signal 302.

The binary signal 303 is generated by slicing the reproduction signal 302 at a slice level using the binary circuit 115 provided after the equalizer 114.

The clock signal 304 is a signal used for extracting the binary signal 303 using the PLL 116, and is a pulse sequence having a time interval T. In other words, the cycle of a reference clock in the clock signal 304 is time T. A clock time interval specified by the clock signal 304 is nT (n: integer).

The synchronization signal 305 is a signal obtained by synchronizing the binary signal 303 with the reference clocks of the clock signal 304.

The PLL 116 outputs the synchronization signal 305 to the demodulation/error correction circuit 117. The demodulation/error correction circuit 117 subjects the synchronization signal 305 to demodulation and error correction to generate a reproduced data signal 118.

The binary circuit 115 outputs the binary signal 303 to the edge shift measuring circuit 120. The PLL 116 outputs the synchronization signal 305 and the clock signal 304 to the edge shift measuring circuit 120.

The edge shift measuring circuit 120 measures a time interval between the binary signal 303 and the synchronization signal 305 and detects an edge shift amount between the measured time interval and a clock time interval specified by the clock signal 304.

Figure 4:
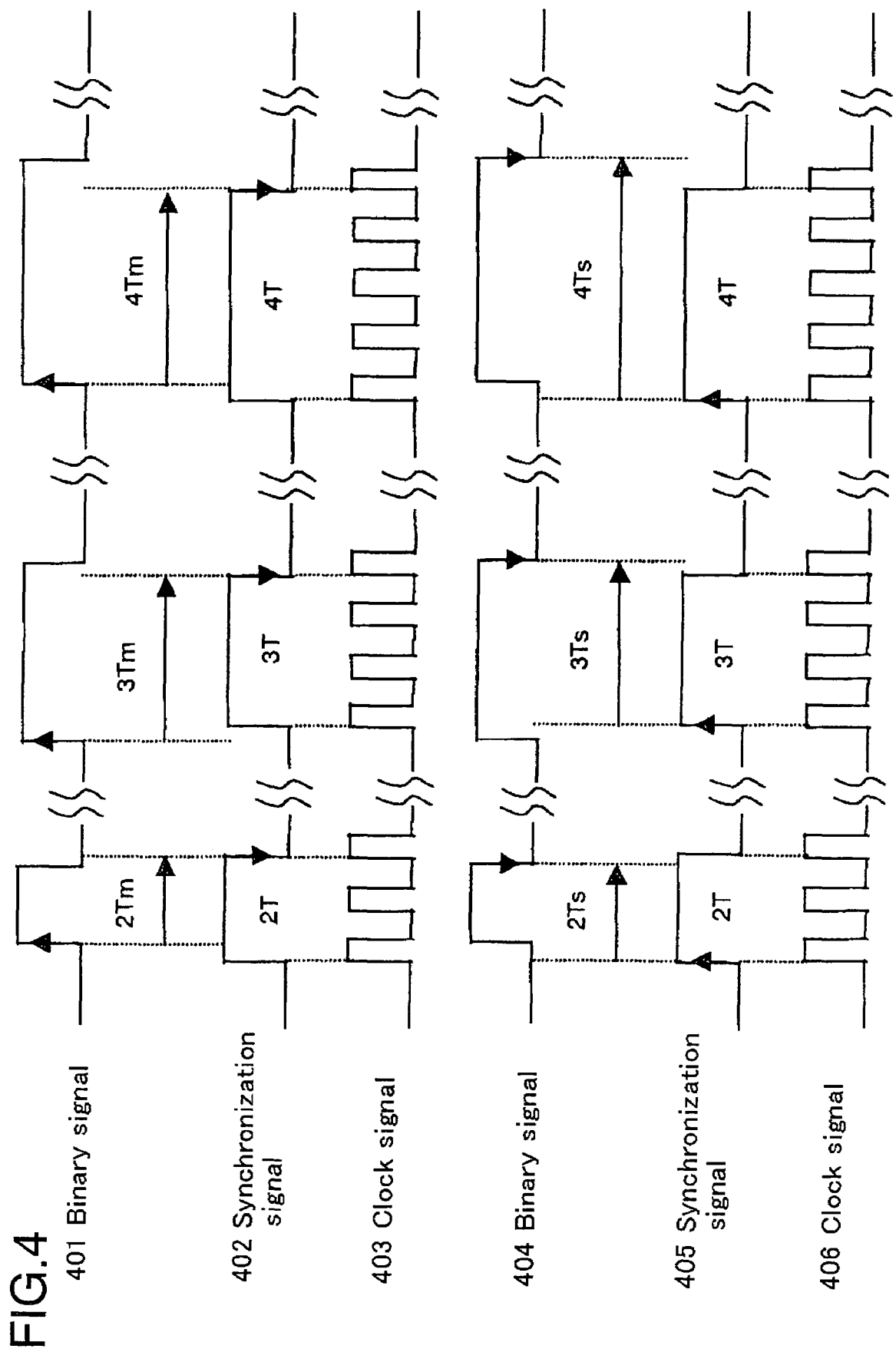
FIG. 4 shows waveform diagrams for explaining measurement of an edge shift amount according to an embodiment of the present invention.

FIG. 4 shows a waveform diagram for explaining measurement of an edge shift amount according to an embodiment of the present invention.

Hereinafter, an embodiment in which the edge shift measuring circuit 120 measures an edge shift amount will be described with reference to FIGS. 1 and 4.

FIG. 4 shows waveforms of a binary signal 401 generated by the binary circuit 115, a synchronization signal 402 generated by the PLL 116, and a clock signal 403 of the PLL 116.

Initially, measurement of an edge shift amount of a leading edge of a mark will be described with reference to FIGS. 1 and 4.

Not all of the binary signal 401, the synchronization signal 402, and the clock signal 403 necessarily take place at the same time. In FIG. 4, corresponding portions are vertically aligned for the sake of clarification.

The edge shift measuring circuit 120 measures a leading edge time interval from the rising edge of a pulse of the binary signal 401 generated by the binary circuit 115 to the falling edge of a pulse of the synchronization signal 402 generated by the PLL 116. Here, a signal pulse corresponds to a mark on the optical disc 101; the rising edge of a pulse corresponds to a mark leading edge; and the falling edge of a pulse corresponds to a mark trailing edge.

The synchronization signal 402 is in synchronization with the clock signal 403 of the PLL 116. Therefore, the length of a pulse of the synchronization signal 402 is an integral multiple of the reference clock T.

The mean values of time intervals measured by the edge shift measuring circuit 120 are categorized into time lengths 2Tm, 3Tm, 4Tm, ..., 8Tm, and 9Tm depending on the length of a pulse of the synchronization signal 402. Here, 2Tm, 3Tm, 4Tm, ... indicate measured values of leading edge time intervals with respect to marks of lengths 2T, 3T, 4T, ..., respectively.

The position of a rising edge of the binary signal 401 corresponds to the position of a leading edge of an actual mark. Distributions of time intervals obtained by repeatedly measuring time intervals 2Tm, 3Tm, 4Tm, ... represent the jitter values and edge shift amounts of marks. The rising edge of a pulse of the binary signal 401 is shifted by a predetermined time from the rising edge of a pulse of the synchronization signal 402. A delay amount $\Delta X$ attributed to a circuit and a measurement instrument is uniformly added for the lengths of marks, considering the relationship between the binary signal 401 and the synchronization signal 402. Therefore, measurement values obtained by actually measuring the lengths of marks are represented by:

$$2Tm = 2T + \Delta 2Tm + \Delta X$$

$$3Tm = 3T + \Delta 3Tm + \Delta X$$

$$4Tm = 4T + \Delta 4Tm + \Delta X$$

(thereafter, 5T or more has the same relationship)

where $\Delta 2Tm$, $\Delta 3Tm$, $\Delta 4Tm$, ... are leading edge shift amounts and 2T, 3T, 4T, ... are time intervals specified by a clock signal.

In the above-described expression, 2T, 3T, 4T, ... represent 2Times T, 3Times T, 4Times T, ..., where T is a reference clock cycle. T is determined by the clock frequency of a reproduction signal. The delay amount $\Delta X$ caused by the delay of a measurement instrument, a measuring means, and a circuit is determined in advance or retained, so that $\Delta X$ can be determined.

Therefore, the edge shift measuring circuit 120 measures time intervals 2Tm, 3Tm, 4Tm, ..., so that leading edge shift amounts $\Delta nTm$ (n: integers) of the lengths of actual marks can be obtained.

Next, measurement of the trailing edge shift amount of a mark will be described.

FIG. 4 shows waveforms of a binary signal 404 generated by the binary circuit 115, a synchronization signal 405 generated by the PLL 116, and a clock signal 406 of the PLL 116.

The binary signal 404, the synchronization signal 405, and the clock signal 406 necessarily take place at the same time. In FIG. 4, corresponding portions are vertically aligned for the sake of clarification.

The edge shift measuring circuit 120 measures a trailing edge time interval from the falling edge of a pulse of the binary signal 404 to the rising edge of a pulse of the synchronization signal 405. Also here, a signal pulse corresponds to a mark on the optical disc 101; the rising edge of a pulse corresponds to a mark leading edge; and the falling edge of a pulse corresponds to a mark trailing edge.

The synchronization signal 405 is in synchronization with the clock signal 406 of the PLL 116. Therefore, the length of a pulse of the synchronization signal 405 is an integral multiple of the reference clock T. The mean values of time intervals measured by the edge shift measuring circuit 120 are categorized into time lengths 2Ts, 3Ts, 4Ts, . . . 8Ts, and 9Ts depending on the length of a pulse of the synchronization signal 405. Here, 2Ts, 3Ts, 4Ts, . . . indicate measured values of trailing edge time intervals with respect to marks of lengths 2T, 3T, 4T, . . . , respectively.

The position of a rising edge of the binary signal 404 corresponds to the position of a leading edge of an actual mark. Distributions of time intervals obtained by repeatedly measuring time intervals 2Ts, 3Ts, 4Ts, . . . represent the jitter values and edge shift amounts of marks. The falling edge of a pulse of the binary signal 404 is shifted by a predetermined time from the falling edge of a pulse of the synchronization signal 405. A delay amount ΔX attributed to a circuit and a measurement instrument is uniformly added for the lengths of marks, considering the relationship between the binary signal 404 and the synchronization signal 405. Therefore, measurement values obtained by actually measuring the lengths of marks are represented by:

$$2Ts = 2T + \Delta 2Ts + \Delta X$$

$$3Ts = 3T + \Delta 3Ts + \Delta X$$

$$4Ts = 4T + \Delta 4Ts + \Delta X$$

(thereafter, 5T or more has the same relationship) where Δ2Ts, Δ3Ts, Δ4Ts, . . . are leading edge shift amounts and 2T, 3T, 4T, . . . are time intervals specified by a clock signal.

In the above-described expression, 2T, 3T, 4T, . . . represent 2Times T, 3Times T, 4Times T, . . . , where T is a reference clock cycle. T is determined by the clock frequency of a reproduction signal. The delay amount ΔX caused by the delay of a measurement instrument, a measuring means, and a circuit is determined in advance or retained, so that ΔX can be determined.

Therefore, the edge shift measuring circuit 120 measures time intervals 2Ts, 3Ts, 4Ts, . . . , so that leading edge shift amounts ΔnTs (n: integers) of the lengths of actual marks can be obtained.

The edge shift measuring circuit 120 outputs a leading edge shift amount and a trailing edge shift amount obtained as described above, which correspond to the length of a mark, to the memory 121. The memory 121 stores the leading edge shift amount and the trailing edge shift amount as movement amounts of a recording pulse.

Alternatively, instead of outputting a leading edge shift amount and a trailing edge shift amount to the memory 121, the edge shift measuring circuit 120 may have parameters of a recording pulse corresponding to a leading edge shift amount and a trailing edge shift amount in advance and outputs the parameters of a recording pulse corresponding to the leading edge shift amount and the trailing edge shift amount to the memory 121. The memory 121 may store the parameters of a recording pulse.

In the foregoing description of the edge position detecting method, the result of detection is categorized depending on the length of a mark. Alternatively, if the polarity is inverted, the result of detection can be categorized depending on the length of a space. More specifically, leading edge shift amounts and trailing edge shift amounts corresponding to lengths of spaces can be obtained.

Figure 5:
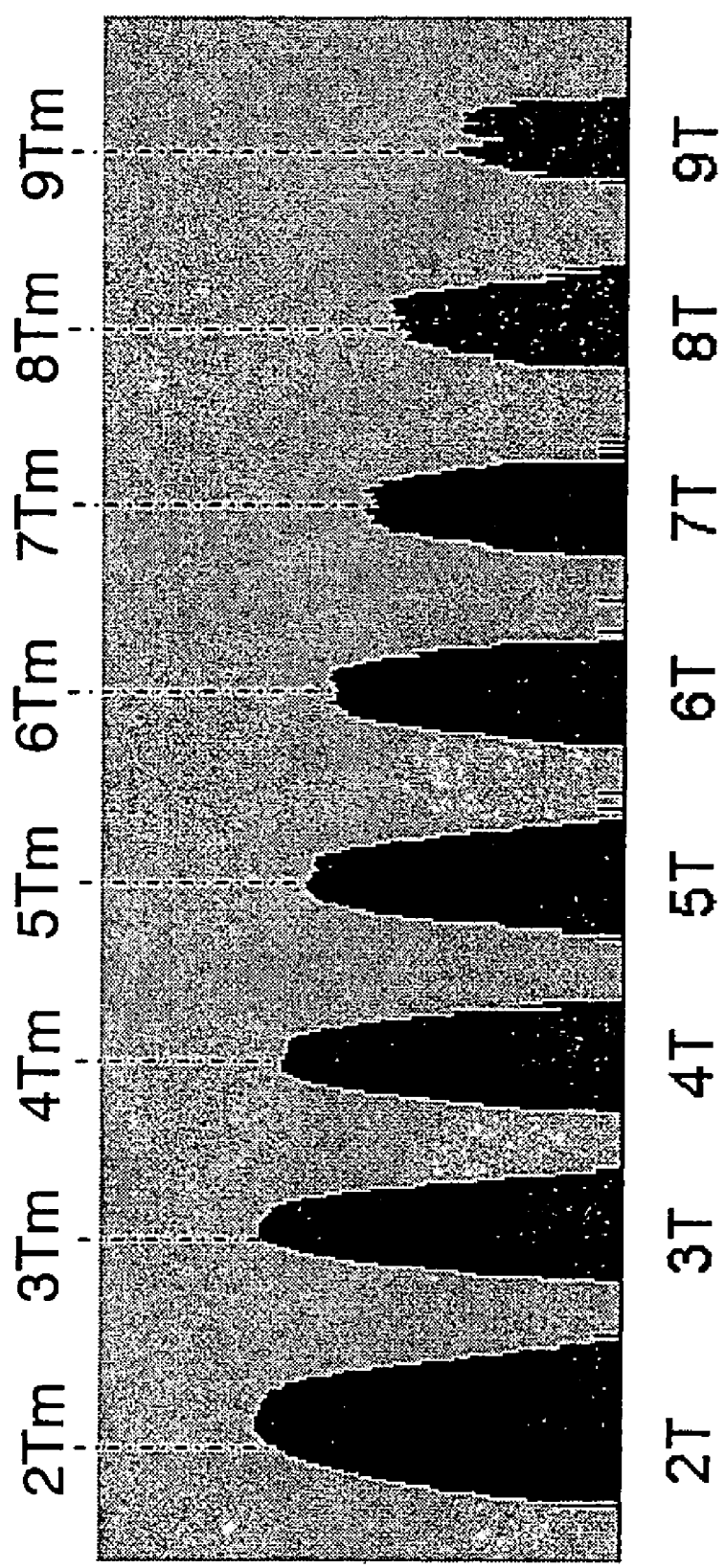
FIG. 5 shows a graph showing a distribution of values measured in an edge shift measuring circuit according to an embodiment of the present invention.

FIG. 5 is a graph showing a distribution of values measured in the edge shift measuring circuit 120 according to an embodiment of the present invention.

FIG. 5 shows the distributions of the time intervals 2Tm to 9Tm obtained by measuring leading edge shift amounts as described with reference to FIG. 4.

As shown in FIG. 5, a time interval from the rising edge of a pulse of the binary signal 401 generated by the binary circuit 115 to the falling edge of a pulse of the synchronization signal 402 generated by the PLL 116 has a distribution depending on the length of a mark.

In FIG. 5, 2T, 3T, 4T, . . . are clock time intervals specified by a clock signal.

Here, a leading edge shift amount is an edge shift amount between a measured time interval and a clock time interval.

If the measured time interval is equal to the clock time interval, the leading edge shift amount is zero. However, a signal obtained by reproducing a mark contains jitter, so that a time interval has a distribution as shown in FIG. 5.

Therefore, the edge shift measuring circuit 120 can measure a jitter value of a mark based on the variance of the distribution of a time interval.

Hereinafter, whether or not a mark corresponding to a reproduction signal used for the binary signal 401 and the synchronization signal 402 is an optimum mark will be described below with reference to FIG. 5.

If the center of the distribution of a time interval is an integral multiple of the reference clock T, a mark corresponding to a reproduction signal is an optimum mark.

The variance of the distribution is increased as the size of a mark corresponding to a reproduction signal is increased or decreased from the size of the optimum mark.

The smaller the distribution variance, the higher the accuracy of data reproduction. Therefore, a smaller distribution variance is preferable. The distribution variance can be reduced by changing a parameter of a recording pulse (e. g., the movement amount, width or power of a recording pulse including a first pulse, a multipulse, and a cooling pulse, and particularly, the width of a multipulse).

Although FIG. 5 shows the distributions of the time intervals 2Tm to 9Tm, the distributions of the time intervals 2Ts to 9Ts have a similar shape.

Figure 6:
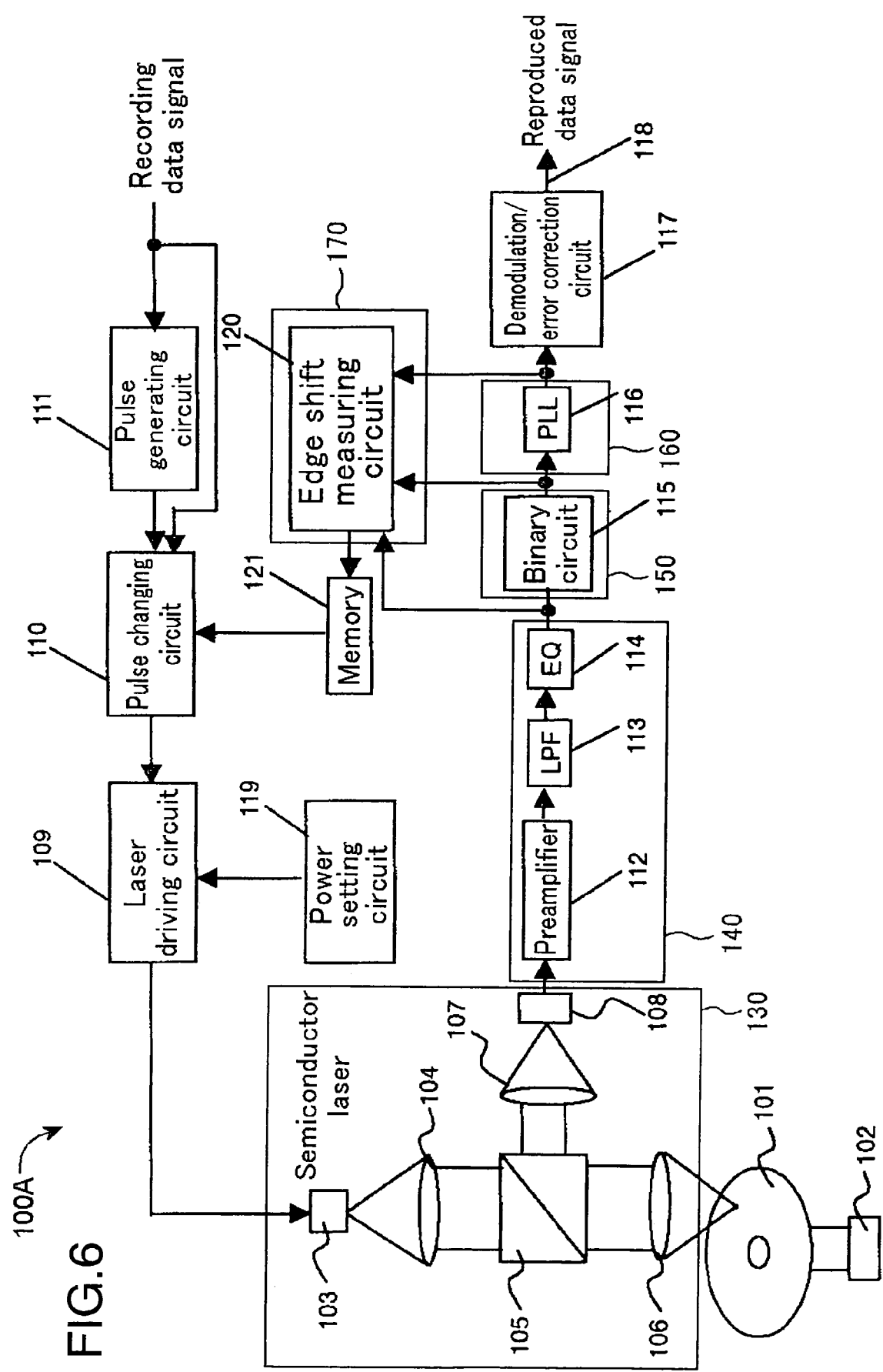
FIG. 6 shows a block diagram showing a recording/reproduction apparatus as a variation of the above-described embodiment of the present invention.

FIG. 6 is a block diagram showing a recording/reproduction apparatus 100A as a variation of the above-described embodiment of the present invention.

The recording/reproduction apparatus 100A has the same configuration as that of the recording/reproduction apparatus 100 (FIG. 1), except that a reproduction signal generated in the reproduction signal generating section 140 is input to the edge shift measuring circuit 120.

Therefore, a description will be given to the case where a reproduction signal generated in the reproduction signal generating section 140 is input to the edge shift measuring circuit 120.

As in the recording/reproduction apparatus 100A, when a reproduction signal is input to the edge shift measuring circuit 120, the edge shift measuring circuit 120 can determine, based on the amplitude of the reproduction signal, which parameter of a recording pulse is optimum (particularly, the width of a multipulse).

Next, a procedure for recording compensation will be described. Recording compensation means that a parameter of a recording pulse is optimized based on an edge shift amount.

Here, an embodiment in which the movement amount of a recording pulse is adjusted at the leading edge portion and the trailing edge portion of a mark will be described. It is possible to adjust the leading edge portion and the trailing edge portion of a mark by moving a plurality of pulses contained in a recording pulse.

Figure 7:
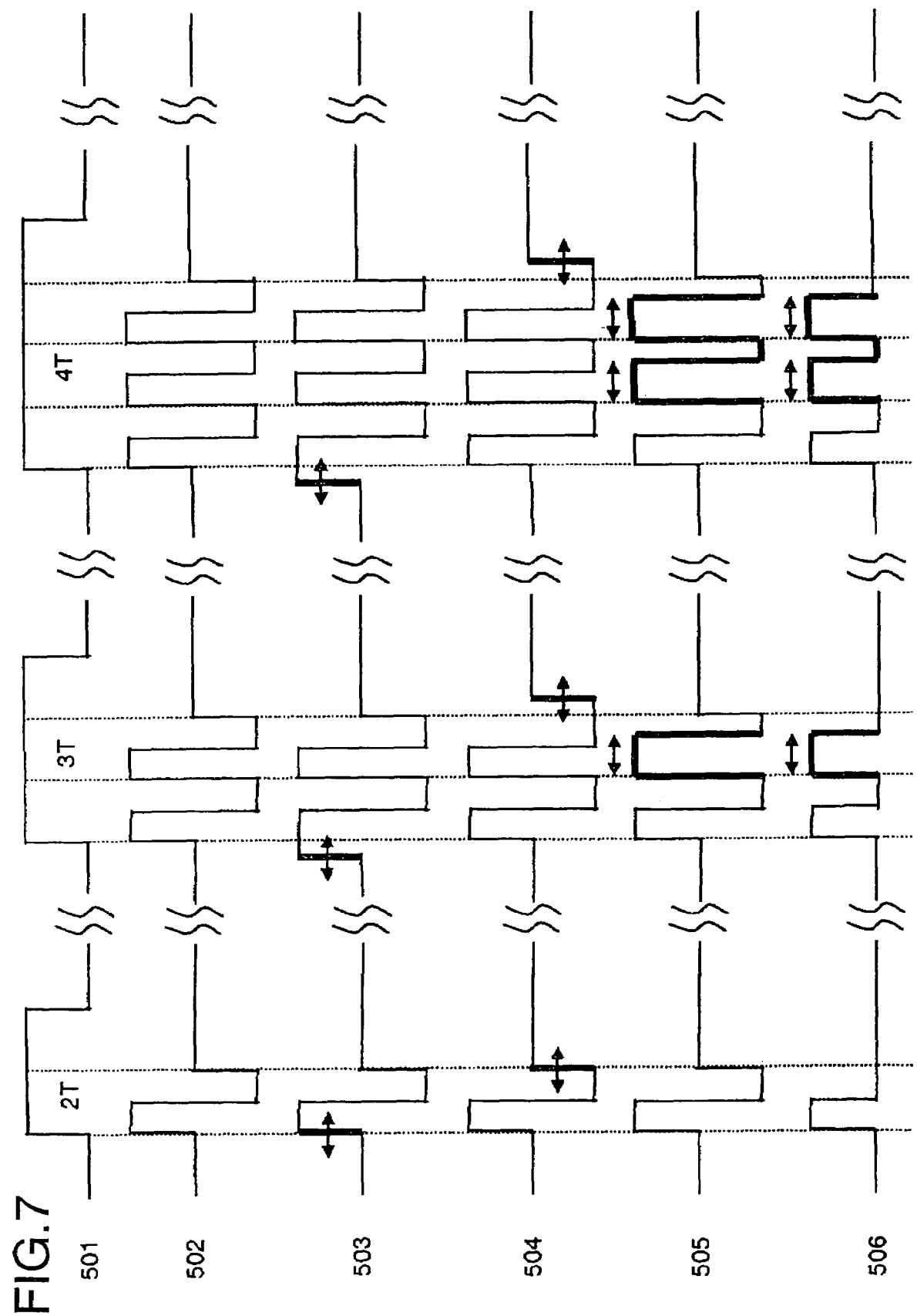
FIG. 7 shows waveform diagrams for explaining a change in a parameter of a recording pulse in recording compensation according to an embodiment of the present invention.

FIG. 7 is a waveform diagram for explaining a change in a parameter of a recording pulse in recording compensation according to an embodiment of the present invention.

Hereinafter, an embodiment of recording compensation will be described with reference to FIG. 1 and FIG. 7.

FIG. 7 shows waveforms showing a recording data signal 501, an output signal 502 generated by the pulse generating circuit 111, and output signals 503 to 506 generated by the pulse changing circuit 110.

Not all of the recording data signal 501, the output signal 502 of the pulse generating circuit 111, and the output signals 503 to 506 of the pulse changing circuit 110 necessarily take place at the same time. In FIG. 7, corresponding portions are vertically aligned for the sake of clarification.

Initially, adjustment of the leading edge portion of a mark will be described.

The pulse generating circuit 111 generates a recording pulse using the recording data signal 501 and outputs the output signal 502 containing the recording pulse to the pulse changing circuit 110.

The pulse changing circuit 110 changes a parameter of a recording pulse of the output signal 502 based on a leading edge shift amount stored in the memory 121.

If a leading edge shift amount is provided for each mark length, the leading edge portion of a mark can be adjusted by changing the width of a first pulse in a recording pulse corresponding to each mark length.

For example, when the leading edge portion of a mark of 3T is detected to be shorter by 1 ns, i.e., when the leading edge shift amount of a mark of 3T is 1 ns, the rising edge of a first pulse of the mark of 3T is shifted forward by 1 ns as shown in the output signal 503, so that the width of the first pulse is increased by 1 ns. The width of the first pulse can be optimized depending on reproduced frequency characteristics or the frequency of a channel clock of a recording data signal. Here, the width of the first pulse is changed in units of 1 ns.

Similarly, the width of a first pulse is changed by moving the rising edge of the first pulse of a recording pulse depending on the detection value of the leading edge portion of a mark of another length.

Alternatively, the leading edge portion of a mark can be adjusted by, for example, moving the position of a first pulse forward or backward (by a predetermined movement amount) instead of the width of the first pulse.

Next, adjustment of the trailing edge portion of a mark will be described.

An output signal 504 is a signal obtained by changing a recording pulse using the pulse changing circuit 110 based on a trailing edge shift amount stored in the memory 121.

If a trailing edge shift amount is provided for each mark length, the trailing edge portion of a mark is adjusted by changing the width of a cooling pulse in a recording pulse for each mark length.

For example, when the trailing edge portion of a mark of 3T is detected to be shorter by 1 ns, i.e., when the trailing edge shift amount of a mark of 3T is 1 ns, the rising edge of a cooling pulse of the mark of 3T is shifted backward by 1 ns as shown in the output signal 504, so that the width of the rising edge of the cooling pulse is changed. The width of the rising edge of the cooling pulse can be optimized depending on reproduced frequency characteristics or the frequency of a channel clock of a recording signal. Here, the width of the rising edge of the cooling pulse is changed in units of 1 ns.

There is a disc, such as a write-once disc, in which the trailing edge portion of a mark cannot be changed only by changing the width or position of a cooling pulse, depending on the composition of a recording film. When data is recording onto such a disc, the width of a multipulse may be changed.

For example, when the trailing edge of a mark of 3T is detected to be shorter by 1 ns, i.e., when the trailing edge shift amount of a mark of 3T is 1 ns, the width of a multipulse of a mark of 3T is increased by 1 ns as shown in an output signal 505. The width of a multipulse can be optimized based on reproduced frequency characteristics and the frequency of a channel clock of a recording signal, but in this case is changed in units of 1 ns. Alternatively, the width of a multipulse may vary in units of an integral multiple of a value produced based on a reference clock T, such as T/16, instead of 1 ns unit.

In the foregoing description, the movement amount or width of a recording pulse is changed as a parameter of a recording pulse. The present invention is not limited to this. In the present invention, the power of a recording pulse may be changed as a parameter of a recording pulse.

For example, as shown in the output signal 506, the bias power may be equal to the bottom power. In this case, the power modulation is binary and no cooling pulse is present.

In this case, an edge shift amount of the trailing edge portion of a mark can be adjusted by further changing at least one of the width and position of a multipulse. Alternatively, an edge shift amount of the trailing edge portion of a mark can be adjusted by changing at least one of the width and the movement amount of a last pulse of the multipulse.

All of the parameter of a first pulse, the parameter of a cooling pulse, and the parameter of a multipulse may be changed.

For example, the movement amount of a first pulse may be changed based on a leading edge shift amount, the movement amount of a cooling pulse may be changed based on a trailing edge shift amount, and the movement amount of a multipulse may be changed based on a jitter value.

Alternatively, the movement amount of a first pulse may be changed based on a leading edge shift amount, the movement amount of a multipulse may be changed based on a trailing edge shift amount, and the movement amount of a cooling pulse may be changed based on a jitter value.

Alternatively, the movement amount of a first pulse may be changed based on a leading edge shift amount, the power of a multipulse may be changed based on a trailing edge shift amount, and the movement amount of a cooling pulse may be changed based on a jitter value.

When a parameter of a first pulse, a cooling pulse, and a multipulse of a recording pulse is changed, parameters can be categorized in accordance with the length of a mark. The following viewpoints should be taken into account in the categorization.

A first viewpoint is an influence of thermal storage on a recording film when a mark is recorded and a difference in thermal storage between each mark length.

Note that an influence of thermal storage on a recording film can be reduced by appropriately obtaining the power of a first pulse or a multipulse (e.g., the peak power Pw, the bias power Pe, or the bottom power Pb) and employing a minimum power so as to form a mark. Alternatively, an influence of thermal storage on a recording film can be reduced by changing and optimizing the width of a multipulse.

An influence of thermal storage on a recording film does not depend so much on mark length. Therefore, an influence of thermal storage on a recording film depending on mark length can be eliminated by employing the same multipulse width for each mark length. In order to obtain an optimum movement amount of a multipulse, it is desirable to control optimization using not only an edge shift amount of the trailing edge portion of a mark but also an indicator indicating the signal quality of a mark, such as jitter, bit error rate (BER), or the like.

A second viewpoint are the characteristics of the equalizer 114. The characteristics of the equalizer 114 depend on the size of a light spot, a minimum mark length, and the like. The size of a light spot is determined by the wavelength of the semiconductor laser 103 and the numerical aperture of the objective lens 106.

Hereinafter, the characteristics of the equalizer 114 will be described in detail.

Figure 8:
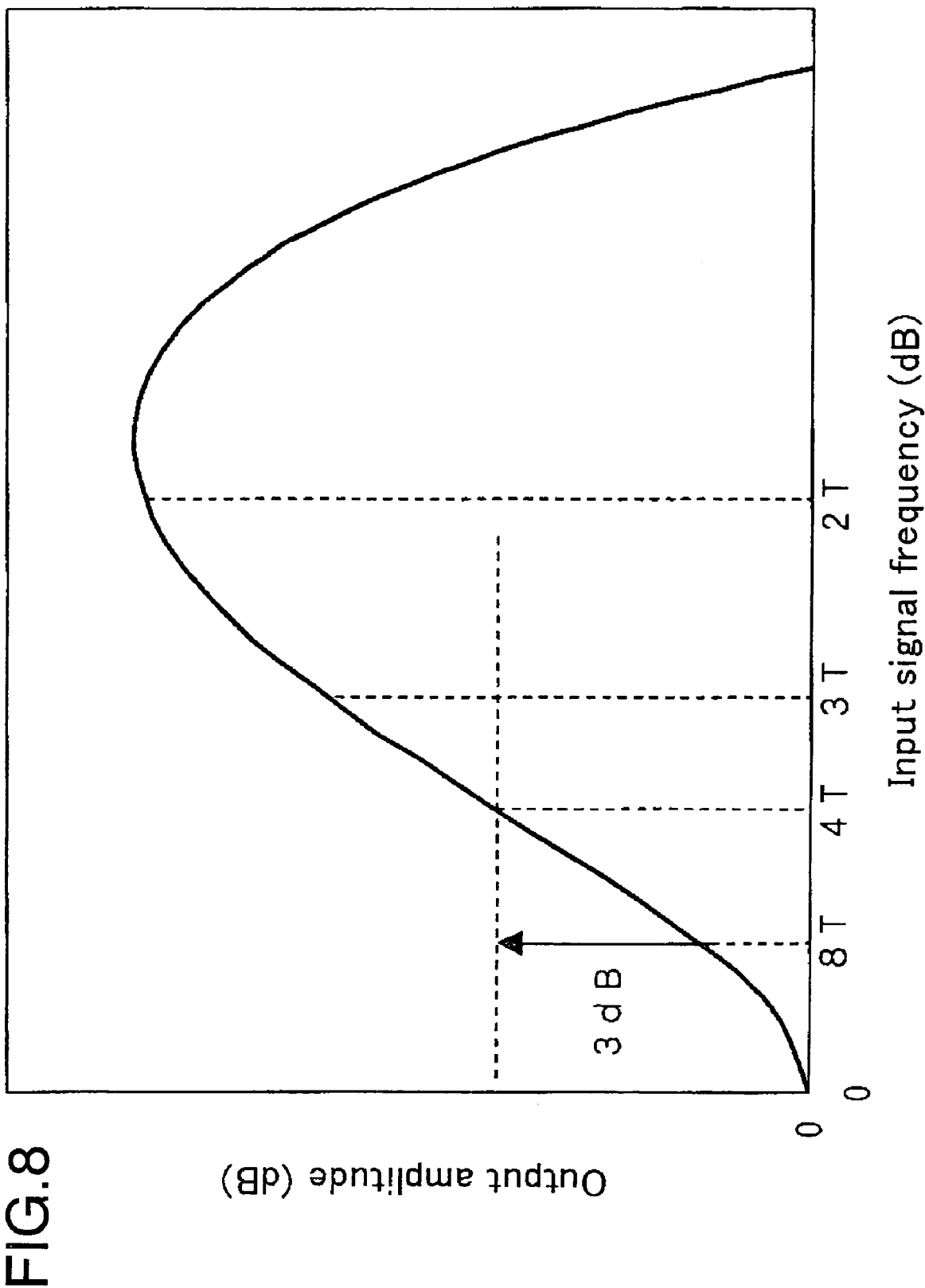
FIG. 8 shows a graph showing frequency characteristics of an equalizer according to an embodiment of the present invention.

FIG. 8 is a graph showing the frequency characteristics of the equalizer 114.

In the graph of FIG. 8, the horizontal axis represents an input signal frequency (dB) and the vertical axis represents an output amplitude (dB) in a logarithmic scale. FIG. 8 indicates a ratio of the amplitude of an output signal to the input signal frequency of the equalizer 114.

2T, 3T, 4T, and 8T on the horizontal axis each represent an input signal frequency of a corresponding mark. A signal having a higher input signal frequency corresponds to a smaller mark (e.g., a signal corresponding to a mark of 2T). In the case of a smaller mark, the amplitude of a reproduction signal is lower. In order to compensate for such an attenuation of the optical frequency characteristics, the characteristics of the equalizer 114 is designed so that the output amplitude is increased.

To achieve this, a high pass filter or a band pass filter having a peak at a frequency slightly higher than 2T, or an amplifier in combination therewith may be employed.

Therefore, a difference between the output amplitude of the equalizer 114 when a high frequency signal is reproduced (e.g., a space or a mark is 2T in length) and the output amplitude of the equalizer 114 when a low frequency signal is reproduced (e.g., a space or a mark is 8T in length), i.e., the gradient of the characteristic curve of the equalizer 114, is increased with a decrease in the shortest mark length. In this case, for example, a difference between the output amplitude of the equalizer 114 when the length of a mark is 4T and the output amplitude of the equalizer 114 when the length of a mark is 8T is also large.

If two marks having a large difference in the output amplitude are grouped into the same category, the position of an edge is no longer reproduced due to the equalizer 114 even when recording is performed so that an influence of the thermal storage or thermal interference of a recording film is removed.

Therefore, it is desirable that for marks grouped into the same category, a difference in the characteristics of the output amplitude of the equalizer 114 is as small as possible.

Among a plurality of marks grouped into the same category, it is desirable that the ratio of the output amplitude of the equalizer 114 with respect to the longest mark to the output amplitude of the equalizer 114 with respect to the shortest mark is smaller than or equal to 3 dB. 3 dB is a numerical value which is relatively often used to separate frequency characteristics into categories. The real value of 3 dB is the square root of 2. In other words, when a signal having a different frequency but the same amplitude is input to the equalizer 114, the ratio of the amplitude of the input signal and the amplitude of an output signal of the equalizer 114 is the square root of 2. In general, if an output amplitude ratio of 3 dB or less is employed as a limit of categorization into the same group, a distortion error due to the equalizer 114 during reproduction is reduced. Thereby, recording and reproduction can be conducted with less jitter.

Now it is assumed that mark edge recording is performed under the conditions where the wavelength of the semiconductor laser 103 is 405 nm, the numerical aperture of the objective lens 106 is 0.85, the shortest mark length is 0.160 μm, the frequency of a reference clock is 66 MHz, and a 17 PP modulation method is employed. It is not desirable that as to the movement amounts of a first pulse and a cooling pulse, marks of less than 4T (i.e., a mark of 3T and a mark of 2T) and a mark of 8T are grouped into the same category. Even when the circuit scale of the pulse changing circuit 110 is taken into account, it is desirable that marks of at least 4T or marks of more than 4T are grouped into the same category.

A third viewpoint is the circuit scale of the pulse changing circuit 110, the setting accuracy of pulse movement, and the limitation of the circuit scale of the memory 121. According to the above-described two viewpoints, it is desirable that marks having a large difference in thermal storage or thermal interference are grouped into different categories and marks having a high ratio of the output amplitudes of the equalizer 114 are grouped into different categories. However, as the number of categories is increased, the number of registers for settings is increased and the circuit scale of the pulse changing circuit 110 is increased. In addition, as the number of categories is increased, a time required for setting is increased no matter whether the setting is performed in a factory or the user. The consumption of a recording track required for setting is also increased. Therefore, it is desirable to minimize the number of categories according to the third viewpoint.

A fourth viewpoint is the type of recording data to be recorded so as to detect an edge portion of a mark. It is assumed that a specific pattern in accordance with the mark categorization is recorded as a signal sequence of recording data. If the number of categories is increased, the number of types of specific patterns to be recorded is increased. In this case, a longer time is required for measurement and a plurality of patterns for edge detection is prepared in advance. Thus, the scale of the apparatus is increased.

On the other hand, according to a method in which an arbitrary random recording data signal is used and recorded, and the leading edge and the trailing edge of each mark contained in the recorded data are detected, the edge positions of a mark can be detected using at least one random sequence. Conventionally, if the number of categories is increased, the number of specific patterns for determining the positions of a mark is also increased. According to the present invention, an arbitrary random sequence is recorded and the edge shift amounts of all marks of 2T to 8T can be measured. Therefore, the number of mark categories can be changed if required and the signal quality of recording signals can be improved if required.

For example, it is assumed that recording pulses already recorded on a disc are grouped into three categories: 2T, 3T, and 4T or more, and the movement amounts of a first pulse, a multipulse, and a cooling pulse are already recorded on the disc. When the above-described trial recording is performed and as a result the quality of the recorded signal does not satisfy a reference value, or when there is a large difference in edge shift amount between a mark of 4T and a mark of 5T among recording pulses of 4T or more, the recorded signal can be improved by subjecting the mark of 4T and the mark of 5T to recording compensation. Here, random data has a data sequence complying with a 17 PP modulation rule or a data sequence generated using a modulation table, in which the probability of appearance of short run lengths is high and the probability of appearance of long run lengths is low. 9T which does not appear in the modulation rule is inserted as a synchronization signal in units of a frame.

As to the above-described determination of optimum categorization, there are several viewpoints. In this embodiment, taking the above-described four points into account, marks are grouped into three categories: marks of 2T, marks of 3T, and marks of 4T or more. Recording compensation is specialized for each category. The present invention is not limited to this. In the present invention, marks may be grouped, if required, into 4 categories: marks of 2T, marks of 3T, marks of 4T, and marks of 5T or more, or alternatively, marks may not be contiguously grouped into marks of 2T, marks of 3T, marks of 4T to 6T+8T, and marks of 7T.

Note that at least one of the mark leading edge portion and the mark trailing edge portion of a recording pulse may be controlled by changing the power of a specific pulse other than the position or width of a recording pulse.

For example, a mark trailing edge portion can be adjusted by changing the bottom power (Pb) of a recording pulse in addition of the movement amounts of a cooling pulse and a multipulse. For example, when the pulse movement accuracy of a recording pulse is 1 ns and an edge portion of a mark is moved by 1 ns or more during reproduction due to the movement of a pulse by 1 ns, the accuracy of an edge portion during reproduction can be improved by changing the bottom power (Pb) of a recording pulse among the powers thereof so as to finely adjust the edge position of a mark.

When there are variations in recording apparatuses, such as a difference in the shape of a light spot on an optical disc and the like, the position of a mark leading edge portion optimum to recording and the position of a mark trailing edge portion optimum to recording vary among recording apparatuses. In this case, optimum position information recorded in a specific area during disc manufacture or representative position information may be reproduced and the obtained information may be used as initial values to perform a trial recording. Thereby, the number of trial recordings which are repeatedly performed until optimum positions are determined for data recording is reduced, resulting in a reduction in time required for optimization.

In the foregoing description, the edge shift measuring circuit 120 of the edge shift measuring section 170 measures an edge shift amount using a pulse of a binary signal and a pulse of a synchronization signal. The present invention is not limited to this. The edge shift measuring section 170 of the present invention may measure an arbitrary edge shift amount using a binary signal and a synchronization signal and determines a parameter of a recording pulse based on the edge shift amount.

In the foregoing description, a phase change optical disc has been described. The present invention is not limited to this. It is clearly understood by those skilled in the art that the present invention can be applied to a write-once optical disc comprising a pigment or the like and the same effect can be obtained. Such an application is within the scope of the present invention.

In the foregoing description, an optical disc has been described. The present invention is not limited to this. In addition to optical discs, it is clearly understood by those skilled in the art that a tape-like or card-like recording medium and a recording/reproduction apparatus using same can be used and the same effect as that which is obtained for the above-described optical disc can be obtained. Such applications are within the scope of the present invention.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

What is claimed is:

1. A recording/reproduction method, comprising the steps of:

generating a binary signal by converting a reproduction signal to a binary form;

generating a synchronization signal using the binary signal, the synchronization signal being in synchronization with a clock signal;

measuring a time interval between the binary signal and the synchronization signal and measuring an edge shift amount between the time interval and a clock time interval specified by the clock signal; and changing a parameter of a recording pulse based on the edge shift amount, wherein the reproduction signal is a signal obtained by reproducing an arbitrary random signal sequence, as a function of the edge shift amount, wherein the step of measuring the edge shift amount comprises measuring a leading edge time interval between a mark leading edge of the binary signal and a mark trailing edge of the synchronization signal, measuring a leading edge shift amount between the leading edge time interval and the clock time interval, measuring a trailing edge time interval between a mark trailing edge of the binary signal and a mark leading edge of the synchronization signal, and measuring a trailing edge shift amount between the trailing edge time interval and the clock time interval, and wherein the measuring step comprises measuring a jitter value; the recording pulse contains a first pulse, a multipulse, and a cooling pulse; and the step of changing the parameter of the recording pulse comprises changing a movement amount of the first pulse based on the leading edge shift amount, changing a movement amount of the cooling pulse based on the trailing edge shift amount, and changing a movement amount of the multipulse based on the jitter value.

2. A recording/reproduction method, comprising the steps of:

generating a binary signal by converting a reproduction signal to a binary form;

generating a synchronization signal using the binary signal, the synchronization signal being in synchronization with a clock signal;

measuring a time interval between the binary signal and the synchronization signal and measuring an edge shift amount between the time interval and a clock time interval specified by the clock signal; and changing a parameter of a recording pulse based on the edge shift amount, wherein the reproduction signal is a signal obtained by reproducing an arbitrary random signal sequence, as a function of the edge shift amount, wherein the step of measuring the edge shift amount comprises measuring a leading edge time interval between a mark leading edge of the binary signal and a mark trailing edge of the synchronization signal, measuring a leading edge shift amount between the leading edge time interval and the clock time interval, measuring a trailing edge time interval between a mark trailing edge of the binary signal and a mark leading edge of the synchronization signal, and measuring a trailing edge shift amount between the trailing edge time interval and the clock time interval, and wherein the measuring step comprises measuring a jitter value; the recording pulse contains a first pulse, a multipulse, and a cooling pulse; and the step of changing the parameter of the recording pulse comprises changing a movement amount of the first pulse based on the leading edge shift amount, changing a movement amount of the multipulse based on the trailing edge shift amount, and changing a movement amount of the cooling pulse based on the jitter value.

3. A recording/reproduction method, comprising the steps of:

generating a binary signal by converting a reproduction signal to a binary form;

generating a synchronization signal using the binary signal, the synchronization signal being in synchronization with a clock signal;

measuring a time interval between the binary signal and the synchronization signal and measuring an edge shift amount between the time interval and a clock time interval specified by the clock signal; and changing a parameter of a recording pulse based on the edge shift amount, wherein the reproduction signal is a signal obtained by reproducing an arbitrary random signal sequence, as a function of the edge shift amount, wherein the step of measuring the edge shift amount comprises measuring a leading edge time interval between a mark leading edge of the binary signal and a mark trailing edge of the synchronization signal, measuring a leading edge shift amount between the leading edge time interval and the clock time interval, measuring a trailing edge time interval between a mark trailing edge of the binary signal and a mark leading edge of the synchronization signal, and measuring a trailing edge shift amount between the trailing edge time interval and the clock time interval, and wherein the measuring step comprises measuring a jitter value; the recording pulse contains a first pulse, a multipulse, and a cooling pulse; and the step of changing the parameter of the recording pulse comprises changing a movement amount of the first pulse based on the leading edge shift amount, changing a power of the multipulse based on the trailing edge shift amount, and changing a movement amount of the cooling pulse based on the jitter value.

4. A recording/reproduction apparatus, comprising:

a binary signal generating section for generating a binary signal by converting a reproduction signal to a binary form;

a synchronization signal generating section for generating a synchronization signal using the binary signal, the synchronization signal being in synchronization with a clock signal;

an edge shift measuring section for measuring a time interval between the binary signal and the synchronization signal and measuring an edge shift amount between the time interval and a clock time interval specified by the clock signal; and a pulse changing section for changing a parameter of a recording pulse based on the edge shift amount, wherein the reproduction signal is a signal obtained by reproducing an arbitrary random signal sequence, as a function of the edge shift amount, wherein the edge shift measuring section measures a leading edge time interval between a mark leading edge of the binary signal and a mark trailing edge of the synchronization signal, measures a leading edge shift amount between the leading edge time interval and the clock time interval, measures a trailing edge time interval between a mark trailing edge of the binary signal and a mark leading edge of the synchronization signal, and measures a trailing edge shift amount between the trailing edge time interval and the clock time interval, and wherein the edge shift measuring section measures a jitter value; the recording pulse contains a first pulse, a multipulse, and a cooling pulse; and the pulse changing section changes a movement amount of the first pulse based on the leading edge shift amount, changes a movement amount of the cooling pulse based on the trailing edge shift amount, and changes a movement amount of the multipulse based on the jitter value.

5. A recording/reproduction apparatus, comprising:

a binary signal generating section for generating a binary signal by converting a reproduction signal to a binary form;

a synchronization signal generating section for generating a synchronization signal using the binary signal, the synchronization signal being in synchronization with a clock signal;

an edge shift measuring section for measuring a time interval between the binary signal and the synchronization signal and measuring an edge shift amount between the time interval and a clock time interval specified by the clock signal; and a pulse changing section for changing a parameter of a recording pulse based on the edge shift amount, wherein the reproduction signal is a signal obtained by reproducing an arbitrary random signal sequence, as a function of the edge shift amount, wherein the edge shift measuring section measures a leading edge time interval between a mark leading edge of the binary signal and a mark trailing edge of the synchronization signal, measures a leading edge shift amount between the leading edge time interval and the clock time interval, measures a trailing edge time interval between a mark trailing edge of the binary signal and a mark leading edge of the synchronization signal, and measures a trailing edge shift amount between the trailing edge time interval and the clock time interval, and wherein the edge shift measuring section measures a jitter value; the recording pulse contains a first pulse, a multipulse, and a cooling pulse; and the pulse changing section changes a movement amount of the first pulse based on the leading edge shift amount, changes a movement amount of the multipulse based on the trailing edge shift amount, and changes a movement amount of the cooling pulse based on the jitter value.

6. A recording/reproduction apparatus, comprising:

a binary signal generating section for generating a binary signal by converting a reproduction signal to a binary form;

a synchronization signal generating section for generating a synchronization signal using the binary signal, the synchronization signal being in synchronization with a clock signal;

an edge shift measuring section for measuring a time interval between the binary signal and the synchronization signal and measuring an edge shift amount between the time interval and a clock time interval specified by the clock signal; and a pulse changing section for changing a parameter of a recording pulse based on the edge shift amount, wherein the reproduction signal is a signal obtained by reproducing an arbitrary random signal sequence, as a function of the edge shift amount, wherein the edge shift measuring section measures a leading edge time interval between a mark leading edge of the binary signal and a mark trailing edge of the synchronization signal, measures a leading edge shift amount between the leading edge time interval and the clock time interval, measures a trailing edge time interval between a mark trailing edge of the binary signal and a mark leading edge of the synchronization signal, and measures a trailing edge shift amount between the trailing edge time interval and the clock time interval, and wherein the edge shift measuring section measures a jitter value; the recording pulse contains a first pulse, a multipulse, and a cooling pulse; and the pulse changing section changes a movement amount of the first pulse based on the leading edge shift amount, changes a power of the multipulse based on the trailing edge shift amount, and changes a movement amount of the cooling pulse based on the jitter value.

* * * * *